United States Patent [19]

Burkholder et al.

[11] Patent Number: 4,581,845

[45] Date of Patent: Apr. 15, 1986

[54] SUFFOCATION-TYPE INSECT TRAP WITH PITFALL AND ATTRACTANT

[75] Inventors: Wendell E. Burkholder, Madison, Wis.; Alan V. Barak, Basking Ridge, N.J.

[73] Assignees: The United States of America as represented by the Secretary of Agriculture, Washington, D.C.; Zoecon Corporation, Palo Alto, Calif.

[21] Appl. No.: 610,949

[22] Filed: May 16, 1984

[51] Int. Cl.⁴ .............................................. A01M 1/00
[52] U.S. Cl. ...................................... 43/107; 43/121; 43/131; 43/132.1
[58] Field of Search ..................... 43/58, 64, 107, 114, 43/121, 131, 132.1

[56] References Cited

U.S. PATENT DOCUMENTS

| | | | |
|---|---|---|---|
| 1,882,380 | 10/1932 | Braun | 43/107 |
| 2,123,995 | 7/1938 | Harroun | 43/131 |
| 2,315,772 | 4/1943 | Closs | 43/121 |
| 3,304,646 | 2/1967 | Staley | 43/131 |
| 3,913,259 | 10/1975 | Nishimura et al. | 43/121 |
| 3,931,692 | 1/1976 | Hermanson | 43/131 |
| 4,227,333 | 10/1980 | Levinson et al. | 43/107 |

OTHER PUBLICATIONS

W. E. Burkholder, "Application of Pheromones for Manipulating Insect Pests of Stored Products," in Insect Pheromones and Their Applications, T. Kono and S. Ishii, eds., 1976, pp. 111-122.

A. V. Barak et al., "Trapping Studies with Dermestid Sex Pheromones," Environ. Entomol. 5: 111-114 (Feb. 1976).

Primary Examiner—Nicholas P. Godici
Assistant Examiner—Kurt Rowan
Attorney, Agent, or Firm—M. Howard Silverstein; David G. McConnell; Curtis P. Ribando

[57] ABSTRACT

A poisonless trap for monitoring and control of insects, especially stored-product pests of the order Coleoptera, comprising a housing device, a pitfall chamber within the housing device, oil within the pitfall chamber, and an attractant. Insects lured into the pitfall by the attractant die by suffocation in the oil.

9 Claims, 5 Drawing Figures

SUFFOCATION-TYPE INSECT TRAP WITH PITFALL AND ATTRACTANT

BACKGROUND OF THE INVENTION

1. Field of the Invention

Insect control in marketing has as its major objective the reduction of losses caused by insects to harvested agricultural commodities and their processed or manufactured products throughout the entire marketing channels and until they are utilized by the final consumer. Products intended for human consumption, such as dry milk, flour, nuts, spices, dried fruits, and processed cereals, are commodities that must be entirely free of living or dead insects or evidence of their presence. Loss of food and food products in storage and in transit due to pests is significant. More effective control of storage pests, particularly in large granaries, small farm storages, ships, and warehouses, could mean an immediate increase in the world's edible grain and food without any change in agricultural productivity.

Several new techniques for controlling stored-product insects have been devised in recent years. These new methods include modified atmospheres, radiation, pathogens, growth regulators, and pheromones, all of which can be combined with the older methods of control, such as sanitation, inspection, good packaging, storage facilities, and pesticides, to achieve an integrated approach to the control of stored-product insects.

Pheromones and other attractants are especially promising against low populations of stored-product insects that, nevertheless, exceed the populations tolerated in food products. In such situations, habitats are usually restricted, and the insects typically populate small foci that expand only gradually. Simple, inexpensive traps baited with insect pheromones or attractants would be useful for monitoring such insects in order to estimate population levels, identify problem species, and initiate efficient control measures. This invention relates to a trap useful for such purposes.

2. Description of the Prior Art

Interest in the use of traps to detect and monitor stored-product Coleoptera and in stored-product pest management programs has steadily increased, particularly during the last decade. The use of corrugated traps with wheat flour bait to trap *Tribolium confusum* Jacquelin duVal was reported by DeCoursey [J. Econ. Entomol. 24: 1079-1081 (1931)]. Wilson [J. Econ. Entomol. 33: 651-653 (1940)] utilized sticky traps treated with alcoholic fish meal extracts for trapping carpet beetle (Dermestidae) larvae in houses. Sticky traps have met with only limited success in that they do not rapidly kill the insects and the level of adhesive required to prevent escapes tends to have a repellent effect. Burkholder [In: Insect Pheromones and Their Applications, T. Kono and S. Ishii, eds., 1976, pp. 111-122] and Barak et al. [Environ. Entomol. 5: 111-114 (1976)] developed a four-layer, 9-cm. square corrugated trap which was baited with the pheromones of *Attagenus unicolor* (Brahm) [=*megatoma* (F.)] and *Trogoderma inclusum* LeConte. Insects lured to the trap were killed by malathion insecticide applied to the trap. This device demonstrated seasonal emergence and distribution of these insects in a grain elevator, milling company, and warehouse. Levinson et al. [Z. ang. Ent. 84: 337-343 (1977)] described a four-layer contact trap made of burlap for trapping *Trogoderma granarium* Everts.

SUMMARY OF THE INVENTION

We have now invented a trap for insects, especially stored-product pests of the order Coleoptera, which does not require either a sticky adhesive or a poisonous insecticide as a killing agent. The trap is an improved modification of the corrugated device disclosed by Burkholder and Barak et al., supra, wherein the dispenser has been converted to a pitfall chamber baited with a sufficient amount of oleaginous substance to cause suffocation. The trap also incorporates novel design features for efficaciously luring the insects into the pitfall chamber.

In accordance with this discovery, it is an object of the invention to provide a poisonless insect trap which offers a potential alternative to frequent blanket application of pesticides, thus reducing the costs and risks of insecticide contamination.

It is also an object of the invention to design a trap which can be reliably used for both monitoring and controlling insect pests.

Another object of the invention is to provide a trap designed to take advantage of any of several insect behavioral patterns and which will also indiscriminately capture both adults and larvae.

It is a further object of the invention to design a versatile trap which can be readily-tailored for capturing either a narrow or broad range of species.

Still another object of the invention is to develop an inexpensive trap which is easily produced and assembled.

Yet another object of the invention is to produce a trap for insect pests which is nonobtrusive and safe for use in the vicinity of stored foods and food products.

Other objects and advantages of this invention will become readily apparent from the ensuing description.

BRIEF DESCRIPTION OF THE DRAWINGS

FIGS. 1-5 illustrate a preferred embodiment of the invention.

FIG. 1 is a perspective view of the trap in a partially unfolded position.

FIG. 2 is a top view of the unfolded housing device.

FIG. 3 is a side view of the partially folded housing device.

FIG. 4 is an exploded view of the pitfall chamber and pheromone dispenser as they relate to the housing device.

FIG. 5 is a detailed fragment view of the assembled trap without the jacket.

DETAILED DESCRIPTION OF THE INVENTION

The trap of the present invention is "poisonless" in the sense that it does not rely upon toxicants such as contact or stomach poisons for inducing a fatal physiological effect other than simple suffocation. While individual components of the trap are known in the art, the invention is a unique combination of cooperating elements including a pitfall chamber, a housing device for the chamber, an attractant, and an oleaginous substance for suffocating the insects captured in the pitfall chamber.

Figure 4:
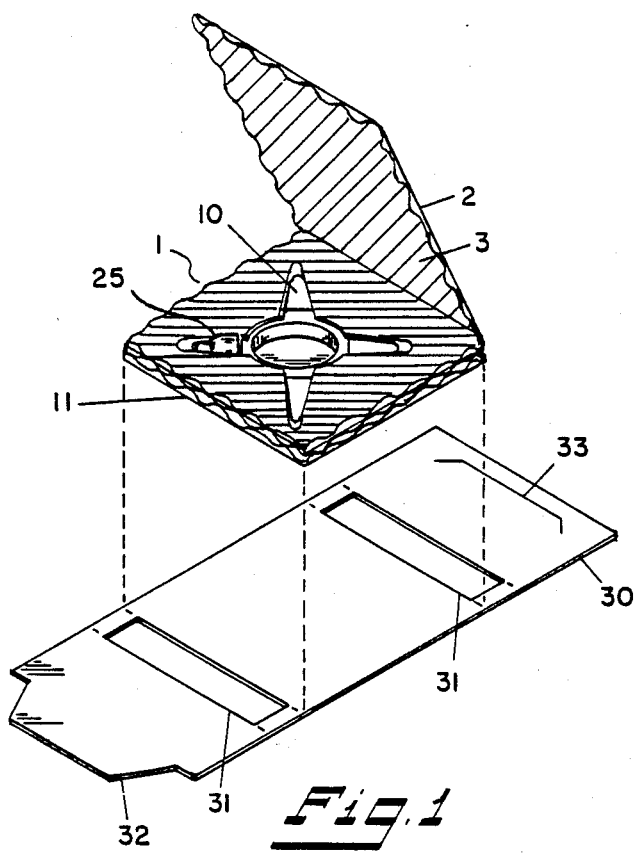
Figure 4:
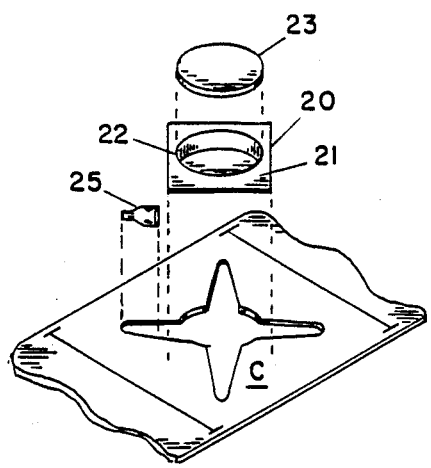
Figure 1:
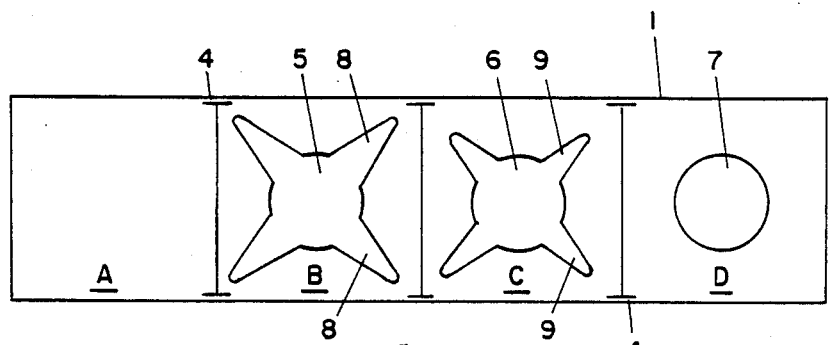
Figure 2:
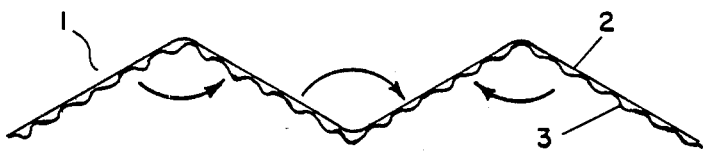
Figure 3:
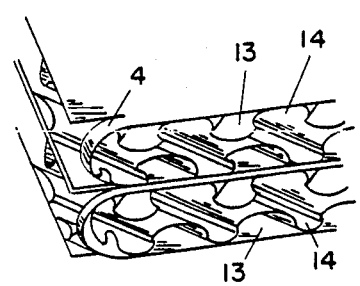

In the preferred embodiment of the invention illustrated in the drawings, the housing device 1 is constructed from single-faced corrugated paperboard having a smooth-faced side 2 and a corrugated side 3. While of course other materials could be used, the paperboard is inexpensive and is conducive to facile manufacture of the trap. As best illustrated in FIG. 2, the housing device is fabricated from a single piece of paperboard comprising four rectangular sections A, B, C, and D serially interconnected by hinges 4. The hinges permit folding of the sections accordion-style into layers as most clearly illustrated in FIGS. 1 and 3. In this manner, section A becomes the top layer with smooth side 2 facing up, and section D the bottom layer with smooth side 2 facing down. Sections B, C, and D have punch-outs 5, 6, and 7, respectively, which collectively form a cavity within the interior of the housing device when it is in the folded position as shown in FIG. 1. The punch-outs 6 and 7 in sections C and D are shaped to accommodate the pitfall chamber 20 as shown in FIG. 4. For reasons to be explained below, it is preferred that the cavity be slightly larger than the external dimensions of the chamber, thereby creating a space between the edge of the paperboard surrounding the cavity and the chamber itself. Upon insertion of pitfall chamber 20 into the cavity, lip 21 surrounding mouth 22 is supported on faced surface 2 of section C. When the housing device 1 is folded shut, the chamber is secured in place by compression of lip 21 between faced surfaces 2 of sections B and C. Sections B and C are also provided with V-shaped cutouts 8 and 9, respectively, which are most expeditiously extensions of punchouts 5 and 6. The cutouts 8 of section B are slightly larger than cutouts 9 of section C. Each corresponding pair of cutouts 8 and 9 forms a concealed air chamber 10 in the housing device. As best illustrated in FIG. 1, the air chambers extend laterally from the pitfall chamber toward the exterior of the housing device.

It is noted in FIG. 1 that the corrugations are oriented diagonally across each section of the housing device. When folded shut, the corrugations of adjacent layers are oriented perpendicular to one another and virtually the entire perimetrical exposure 11 is available for ingress by the insects. Referring to FIG. 5, the preformed spacings 13 between the corrugated paper and the facing paper of each layer, as well as the interstitial spacings 14 between opposing corrugated surfaces of adjacent layers, define passages for movement of the insects. On each of the layers, a plurality of these passages are intersected by each of the air chambers 10. Most of the passages defined by preformed spacings 13 terminate either in air chambers 10 in sections B and C or in the aforementioned space surrounding the pitfall chamber in sections C and D. This permits interlayer (vertical) movement within housing device 1. The mouth 22 of pitfall chamber 20 is thereby accessible from the exterior by means of the preponderance of the passages within the housing device. In an alternate embodiment not shown, narrow slits can be made to diagonally bisect sections A and D across the grain of the corrugations. The slits would serve to render the pitfall chamber accessible from the preformed spacings 13 in these sections which do not otherwise open into the interior of the housing device. It would be discretionary whether the slits be limited to corrugated surface 3 or pass through the entire thickness of the paperboard. The top surface of section C which protrudes out from under the V-shaped cutout 8 of section B by virtue of the aforementioned differential cut of cutouts 8 and 9 serves in conjunction with the lip 21 of the pitfall chamber as a deck for lateral movement toward the mouth of the pitfall chamber.

Referring to FIG. 4, pitfall chamber 20 is optionally fitted with an absorbent disc 23. The disc can be economically constructed of blotter paper and is intended to prevent spillage of oleaginous substance (hereafter referred to as "oil") from the pitfall chamber during handling. Spillage can also be inhibited by extending lip 21 inwardly across a portion of the mouth 22. The level of oil in the chamber should be sufficient to form a thin coating over the bodies of the insects expected to be captured during the trapping period. When the absorbent disc is used, it should be thoroughly saturated. The type of oil is not critical and may be selected from any of the mineral oils, vegetable oils, or combinations thereof. Many vegetable oils are known to be naturally attractive to insects and can be advantageously selected to perform a dual function. Alternatively, food or other insect attractant known in the art can be added to the oil in order to assist in luring insects to the vicinity of the trap and into the pitfall chamber.

As previously mentioned, pheromones are also effective lures. They can be categorized into two groups: sex pheromones, which are produced by adult females for attracting males; and aggregation pheromones, which are produced by adults, usually males, for attracting both males and females. Pheromones are typically species specific and therefore should be selected in terms of the prevalent insect pest or pests in the trapping area. Of course, synthetic pheromones can be substituted for the natural counterpart. The substance can be applied to any of the surfaces of the housing device or even incorporated into the oil added to the pitfall chamber. In the most preferred embodiment of the invention, there is provided a pheromone dispenser 25 adapted for insertion into one of the air chambers 10 as shown in FIGS. 1 and 4. The dispenser can be held in place by frictional engagement with the side walls of the air chamber. Of course, multiple dispensers and pheromones can be used simultaneously in a single trap. In regard to luring insects to the mouth of the pitfall chamber, the air chambers cooperate with dispenser 25 by allowing the pheromone to emanate throughout the multiple layers and passages of the trap. In the same manner, the air chambers assist in dispersing volatile attractants from the oil.

Referring again to FIG. 1, the trap is contained and secured in the folded position by means of a protective jacket 30 which is preferably constructed of moisture repellent paper or other inexpensive material. The jacket is adapted to wrap around the trap while maintaining maximum exposure of perimeter 11 by means of windows 31. The interlocking of tab 32 into slot 33 secures the jacket in place.

In practice, it is envisioned that the trap would be packaged as a kit including the housing device, the pitfall chamber, the optional absorbent disc, the pheromone dispenser, the jacket, and sealed containers comprising an appropriate selection of oils and pheromones. At the time of use, the trap would be assembled by first inserting the pitfall chamber 20 from the smooth side of section C into punchouts 6 and 7. If disc 23 is to be used, it is then inserted into pitfall chamber 20 so as to rest on the bottom thereof. After adding the oil, section B is folded over the lip 21 of the chamber, thereby securing it in position. Optionally, 1–4 pheromone dispensers 25 are inserted into air chambers 10 and section A is folded down. The folded structure is then secured in jacket 30 and placed in the trapping site. By freshly baiting the trap at the time of assembly, maximum effectiveness is insured and tailoring to the species anticipated in the treatment zone is possible.

This novel invention finds application for virtually all species of insects, both adult and larval, which are physically capable of, and prone to, entry. Principal utility is for stored-product pests, especially those of the order Coleoptera. Without limitation thereto, exemplary pests include *Atthagenus unicolor, Trogoderma variabile* (the warehouse beetle), *Trogoderma glabrum, T. granarium* (the khapra beetle), *T. inclusum, Tribolium castaneum* (the red flour beetle), *Tribolium confusum* (the confused flour beetle), *Oryzaephilus surinamensis* (the sawtooth grain beetle), and *O. mercator* (the merchant grain beetle).

Specific applications of the present trap include (1) survey and surveillance programs by industry and by regulatory agencies, (2) monitoring effectiveness of control programs, (3) monitoring point sources of insect activity, such as specific equipment items, (4) establishing phenological patterns of insect activity, (5) monitoring goods in transit, (6) detecting household insects, and (7) insect control in food processing, food storage, and food distribution facilities.

For monitoring purposes, the traps should be placed in areas susceptible to infestation during periods of insect activity; that is, when temperatures exceed about 13° C. (55° F.). Initial placement should be in a grid pattern at intervals of 8–16 meters. Placement should also be in areas with a history of infestation, near suspected sources of contamination, and near likely hiding places. It will be apparent from periodic inspections whether the density of the traps should be increased in particular areas for purposes of insect control. It may also be necessary to replenish the oil and/or attractant at periodic intervals as readily determined by the practitioner.

In operation, the multiple entry points provided by spacing 13 and 14 facilitate access to the pitfall chamber. The passages formed by the corrugations or as otherwise constructed provide both tactile stimuli and concealment, thereby being conducive to entry. In this sense, the housing device is perceived as a shelter, especially by those species exhibiting exposure/hiding diel behavior patterns. The air chambers 10 promote circulation of attractant odors and unrestricted insect movement. Once inside, most insects eventually are lured to, or adventitiously drop into, the pitfall chamber. Oil is thereafter drawn up over the body by capillary action, thereby coating the spiracles and causing suffocation.

The following examples are intended only to further illustrate the invention and are not intended to limit the scope of the invention which is defined by the claims.

EXAMPLES 1–4

Traps essentially constructed in accordance with the preferred embodiment of the invention were evaluated for efficacy of capturing three common, stored-product pests using an oil attractant without pheromones. The traps were cut from single-faced, A-flute corrugated fiberboard 9 cm. on a side when folded, and having 4-cm. circular punchouts for the pitfall chamber. The V-shaped grooves in section B were cut to within about 1 cm. of the corners and those in section C to within about 1.5 cm. Pitfall chambers comprised cylindrical plastic dishes (individual serving butter cups) 1 cm. deep and 3.5 cm. in diameter fitted with discs cut from 1-mm. thick blotter paper.

The traps were evaluated in arenas made by lining ca. 48×51 cm. square stainless steel trays with clean newsprint paper. The sides of the trays were "Teflon" coated to prevent insect escape. Four replicates, each one test and one control, were run simultaneously. Tests were conducted in a dark room held at 25°±1° C. Traps were placed in opposite corners of the trays, ca. 10 cm. from the edges, and thereafter 40 to 50 insects of the appropriate species were released in the center of the tray. Trap counts were taken 16 or 48 hours later.

All insects used in the laboratory tests were reared at 27°±2° C., 60±10% R.H. under a 16:8, L:D photoperiod. *T. confusum* were reared on a diet of whole wheat flour+5% w/w dried brewers yeast. *O. surinamensis* were reared on rolled, uncooked oats and 5% brewers yeast. *Trogoderma variabile* Ballion larvae were reared on a diet as follows:

| Component | Parts |
| --- | --- |
| "Purina" dog food | 8 |
| wheat germ | 3 |
| dry milk | 3 |
| brewers yeast | 1 |
| meat and bone meal | 1 |

The pitfall chambers of test traps were baited with 0.6 ml. oil attractant comprising a blend of equal parts "Sontex 100" white mineral oil, unrefined wheat germ oil, and a pentane extract of raw rolled oats. The control traps were baited with a similar amount of "Sontex 100" mineral oil. The results of the evaluations are reported in Table I, below.

TABLE I

| Example | Species | | Test | Control | Percent trapped[c] | $(X^2)$[d] | p[e] |
| --- | --- | --- | --- | --- | --- | --- | --- |
| 1 | *Oryzaephilus surinamensis* (adults) 16 hrs. | Total trapped[a] | 50 | 44 | 64.4 | 0.38 | n.s. |
| | | Trapped in oils | 16 | 2 | | 10.89 | ≦0.005 |
| 2 | *Tribolium confusum* (adults) 16 hrs. | Total trapped[a] | 109 | 41 | 95.0 | 30.83 | ≦0.005 |
| | | Trapped in oils | 33 | 5 | | 20.63 | ≦0.005 |
| 3 | *Trogoderma variabile* (larvae) 16 hrs. | Total trapped[a] | 133 | 59 | 96.0 | 28.52 | ≦0.005 |
| | | Trapped in oils | 96 | 12 | | 65.33 | ≦0.005 |
| 4 | *Trogoderma variabile* | Total trapped[b] | 139 | 40 | 89.5 | 54.75 | ≦0.005 |
| | | Trapped in oils | 108 | 15 | | 70.32 | ≦0.005 |

TABLE I-continued

| Example | Species | Test | Control | Percent trapped[c] | (X²)[d] | p[e] |
|---------|---------|------|---------|--------------------|---------|------|
|         | (larvae) 48 hrs. |   |         |                    |         |      |

[a]Four replicates of 40 adults each (1-4 weeks old).
[b]Four replicates of 50 larvae each (3-4 weeks old).
[c]Percent insects in or under test plus control traps.
[d]Based on number of insects responding.
[e]Significance of test vs. control catch.

It is understood that the foregoing detailed description is given merely by way of illustration and that modification and variations may be made therein without departing from the spirit and scope of the invention.

We claim:

1. A poisonless insect trap comprising a multileveled housing device, a pitfall chamber substantially concealed within the housing device for capturing said insects and having a mouth at the top thereof, a plurality of passages adapted to render the mouth of said pitfall chamber accessible to the insects from the exterior of said device, an attractant for the insects in the locus of said pitfall chamber, a sufficient amount of oleaginous substance in the bottom of said chamber for suffocating the captured insects, and one or more concealed air chambers within said housing device, wherein each of said air chambers is peripheral to said pitfall chamber and extends laterally therefrom toward the exterior of the housing device so as to intersect a plurality of said passages which thereby terminate in the air chamber on each of at least the level of said mouth and the level immediately below the level of said mouth, whereby the air chambers are adapted to facilitate both interlevel accessibility to the mouth of the pitfall chamber and also dispersion of the attractant throughout the housing device.

2. A trap as described in claim 1 wherein said housing device comprises multiple layers of corrugated material arranged so as to form said plurality of passages.

3. A trap as described in claim 2 wherein the corrugations of adjacent layers of said corrugated material are oriented at substantially 90° to one another.

4. A trap as described in claim 1 further comprising at least one removable dispenser for dispersing a volatile attractant, whereby said dispenser is adapted to be securely held within one of said air chambers.

5. A trap as described in claim 3 wherein said corrugated material is paper.

6. A trap as described in claim 5 wherein each layer is hinged to each adjacent layer.

7. A trap as described in claim 6 wherein the number of layers of corrugated paper is four.

8. A poisonless insect trapping kit comprising:
   a. a housing device fabricated from single-faced corrugated paper having a smooth side and a corrugated side, wherein said paper is shaped into four substantially square interconnected sections such that the corrugations are oriented diagonally across each section and wherein the paper is adapted to be folded accordion-style, whereby each section forms one of four layers with the smooth side of said top and bottom layers defining the exterior of said device;
   b. a pitfall chamber having a mouth and a lip protruding outwardly from the mouth;
   c. a cavity within the housing device adapted to receive the pitfall chamber whereby said chamber is secured within the cavity by compression of said lip between the smooth surfaces of the two middle layers;
   d. an insect attractant for application to said trap;
   e. one or more concealed air chambers wherein each of said air chambers is formed within the two middle layers of said housing device, is peripheral to said pitfall chamber, and extends laterally therefrom toward the exterior of the housing device so as to intersect a plurality of said passages which terminate in the air chamber on each of said two middle layers, whereby the air chambers are adapted to facilitate both interlayer accessibility to the mouth of the pitfall chamber and also dispersion of the attractant throughout the housing device;
   f. an oleaginous substance for placement within the pitfall chamber; and
   g. a jacket adapted to rigidly secure the housing device in a folded position while maintaining essentially the entire perimeter of the device exposed to the ambient.

9. A poisonless insect trapping kit as described in claim 8 and further comprising one or more dispensers for dispersing an attractant wherein each of said dispensers is adapted to be securely held within one of said air chambers.

* * * * *